United States Patent [19]
McDonald et al.

[11] 3,944,891
[45] Mar. 16, 1976

[54] CIRCUIT FOR VERIFYING CORRECT CONNECTIONS TO A THREE-WIRE DUAL VOLTAGE POWER DISTRIBUTION SYSTEM AND THE ABSENCE OF OPEN CIRCUIT CONDITIONS THEREIN

[76] Inventors: Thomas Michael McDonald, 223 Wheeler Road, Monroe, Conn. 06468; Paul Muchnick, One Huckleberry Drive North, Norwalk, Conn. 06058

[22] Filed: Apr. 3, 1974

[21] Appl. No.: 457,575

[52] U.S. Cl............ 317/48; 317/27 R; 317/33 SC; 324/86; 307/127; 340/223; 317/18 D
[51] Int. Cl.² .................................................. H02H 3/26
[58] Field of Search ......... 317/47, 48, 27 R, 43, 39; 324/83 R, 83 A, 86; 307/127, 252 B; 340/223, 248; 328/133; 323/119

[56] References Cited
UNITED STATES PATENTS

| | | | |
|---|---|---|---|
| 2,687,512 | 8/1954 | Miller et al. | 317/48 X |
| 2,989,698 | 6/1961 | Bennett | 324/83 A |
| 3,248,610 | 4/1966 | Faglie | 317/47 X |
| 3,364,363 | 1/1968 | Iordanidis | 307/127 |
| 3,431,467 | 3/1969 | Calfee | 317/47 |
| 3,548,259 | 12/1970 | McDonald | 317/27 R X |
| 3,596,137 | 7/1971 | Kirsch | 317/47 |
| 3,611,050 | 10/1971 | Weber | 317/48 X |
| 3,681,636 | 8/1972 | Calfee | 317/47 |
| 3,764,904 | 10/1973 | Drexler | 317/47 X |

*Primary Examiner*—J. D. Miller
*Assistant Examiner*—Patrick R. Salce

[57] ABSTRACT

Circuitry is utilized to interconnect loads to the power distribution system and only conducts current when voltage conditions from the system are appropriate. Therefore, the load is deenergized whenever reversed connections are made to the power distribution system, or whenever an open circuit exists in any line thereof. Latching means can be included in the circuitry to continually energize the load when an open circuit develops in either nongrounded or hot line of the power distribution system after the load has been initially energized therefrom. Furthermore, the effect of the latching means is externally controlled through a switching means so that remote circuit conditions can be synchronized therewith. When an indicating means is incorporated as the load, the circuitry functions as a detector and when the circuitry is utilized with a circuit breaker to deenergize the load, ground fault protection can be incorporated therewith.

13 Claims, 8 Drawing Figures

CIRCUIT FOR VERIFYING CORRECT CONNECTIONS TO A THREE-WIRE DUAL VOLTAGE POWER DISTRIBUTION SYSTEM AND THE ABSENCE OF OPEN CIRCUIT CONDITIONS THEREIN

BACKGROUND OF THE INVENTION

The present invention relates to circuitry which precludes the energizing of a load from a three-wire, dual voltage, power distribution system whenever an open circuit exists in the system or correct connections have not been made thereto. Three-wire, dual voltage, AC power distribution systems are widely utilized for supplying electrical service to homes and industry. In such systems, an equal voltage is available between either of two hot lines and a neutral line, however, between the two hot lines the voltage magnitude is double. Therefore, conditions hazardous to equipment can occur when distribution boxes are incorrectly connected to such a system or when an open circuit develops in a line thereof. Such hazardous conditions are frequently encountered at construction sites where temporary power installations are utilized in which portable distribution boxes are randomly disposed and interconnected by electrical cables.

Circuitry is known by which power transmission through distribution boxes is precluded when improper connections have been made to the power distribution system or when an open circuit exists in a line thereof. However, all such circuitry is either expensive to incorporate or of limited adaptability to other desirable circuit refinements. One such circuit refinement is that after the distribution box has been energized from the system, power will continue to be transmitted therethrough from either hot line when an open circuit occurs in the other hot line. In some applications, this circuit refinement must be further sophisticated in that transmission of power is only continued if particular equipment, such as a DC power supply, is connected to the hot line having no open circuit therein. Another highly desirable refinement is to provide ground fault protection for the power transmitted through the distribution box.

SUMMARY OF THE INVENTION

It is, therefore, a general object of the present invention to verify that proper connections exist to a three-wire power distribution system and the absence of open circuit conditions therein with a logic circuit which minimizes the disadvantages of the prior art.

It is another object of the present invention to include a latching means in the logic circuit thereof for overriding the deenergizing effects which result from open circuit conditions occuring after the absence of such conditions has been initially verified.

It is still another object of the present invention to combine the logic circuit thereof with means for providing ground fault protection.

These objects are accomplished according to the present invention by combining a polarity-responsive means with a switching means to synchronize conductivity through the latter with conditions of opposite voltage polarities in the power distribution system. A voltage dividing means is incorporated as part of this logic circuit in a particular embodiment and produces a holding current for latching the switching means in the conductive state when an open circuit develops in either hot line of the power distribution system. The holding signal is directed through an externally controlled switching means to preclude the latching effect until after power has been initially drawn from the system. Furthermore, conditions existing remotely from the logic circuit can be coordinated with the latching effect through the externally controlled switching means in various applications. In one preferred embodiment, the logic circuit is utilized with a low voltage release coil of a circuit breaker to interrupt the flow of current from the power distribution system to a load. Where ground faults between the breaker poles of the circuit breaker and the load are to be detected, a differential current sensing means is connected to drive a second tripping coil of the circuit breaker when supply current to, and return current from the load, differ by a predetermined magnitude.

BRIEF DESCRIPTION OF THE DRAWINGS

The manner is which these and other objects of the present invention are achieved will be best understood by reference to the following description, the appended claims, and the attached drawings wherein:

DESCRIPTION OF THE PREFERRED EMBODIMENTS

Figure 1:
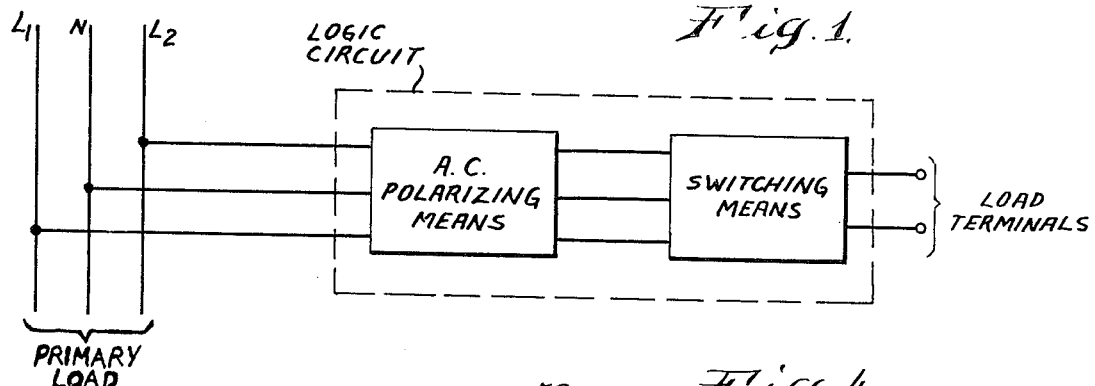
FIG. 1 is a block diagram for the logic circuit of this invention.

Turning now to the drawings, and more particularly to FIG. 1, there is illustrated a block diagram of a logic circuit for verifying proper connections to a three-wire, dual voltage, AC power distribution system and the absence of open circuit conditions therein. The power distribution system includes two hot lines $L_1$ and $L_2$ and a neutral line N, each of which connect to the logic circuit. Generally, the logic circuit includes a switching means for interrupting current flow and a polarity-responsive means for synchronizing conductivity through the switching means with conditions of opposite voltage polarities in the hot lines $L_1$ and $L_2$ relative to the neutral line N. Terminals are provided for connecting a load to the power distribution system through the switching means which, therefore, controls current flow through the load in accordance with conditions existing in the power distribution system, as sensed by the logic circuit. Of course, if a means for providing an indication of electrical conductivity is integrated as the load with the logic circuit, a detector would result.

Figure 2:
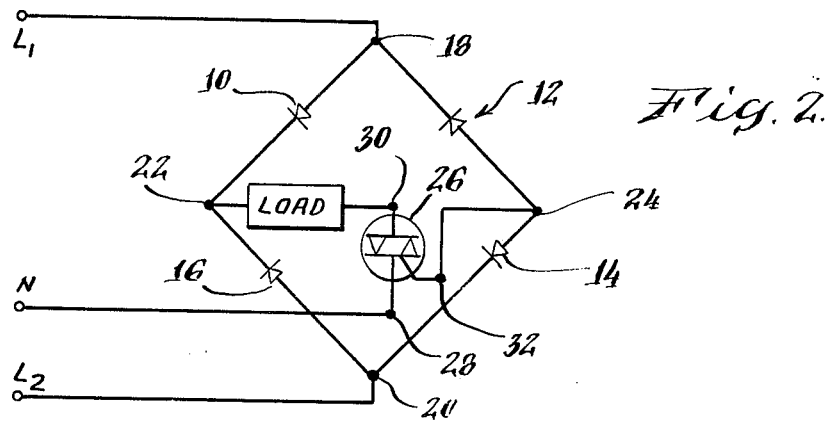
FIG. 2 is a schematic showing one possible circuit arrangement for the logic circuit of this invention.

Semiconductor devices can be utilized in the logic circuit and one possible arrangement thereof is illustrated in FIG. 2. In this arrangement a conventional rectifier is disposed as the polarity-responsive means and includes diodes 10, 12, 14 and 16 interconnected as a bridge having AC input terminals 18 and 20 and DC output terminals 22 and 24. A triac 26 having first and second main terminals 28 and 30 respectively, along with a gate 32, is disposed as the switching means in this arrangement with the gate 32 connected to one of the DC output terminals 24. In use the logic circuit connects to the power distribution system with the AC input terminals 18 and 20 across the hot lines $L_1$ and $L_2$ and the first main terminal 28 to the neutral line N. The second main terminal 30 and the other DC output terminal 22 constitute the load terminals.

In operation the logic circuit allows current to pass through the load only if the voltages of the hot lines $L_1$ and $L_2$ are opposite in polarity relative to the neutral line N. This is so because the rectifier only applies a voltage to the second main terminal 30 through the load, when either hot line $L_1$ or $L_2$ is positive and only applies a voltage to the gate 32 when either hot line $L_1$ or $L_2$ is negative. Since the triac 26 will not conduct current between the first and second main terminals 28 and 30 unless voltages exist simultaneously at the second main terminal 30 and the gate 32, no current will flow through the load when the logic circuit has been incorrectly connected to the lines $L_1$, $L_2$ and N or open circuit conditions exist in these lines. Although a full-wave rectifier is shown in FIG. 2, a half-wave rectifier could be utilized where the load is responsive to the decreased average voltage resulting therefrom. Therefore, the logic circuit of FIG. 2 could be operational with either diodes 10 and 14 or 12 and 16 deleted from the circuit.

Figure 3:
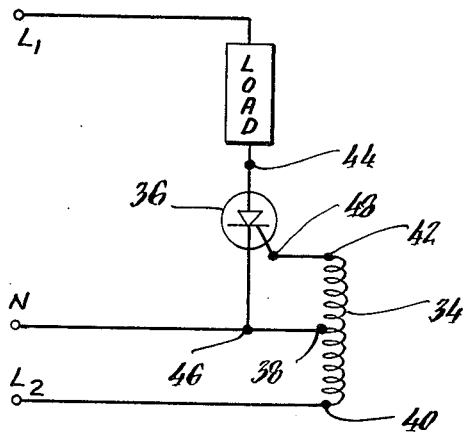
FIG. 3 is a schematic showing a second possible circuit arrangement for the logic circuit of this invention.

Another arrangement of devices which can be used for the logic circuit is shown in FIG. 3 where an autotransformer 34 is disposed as the polarizing means and a silicon controlled rectifier 36 is disposed as the switching means. The autotransformer 34 includes a tap terminal 38 and a pair of winding terminals 40 and 42 while the silicon controlled rectifier 36 includes an anode 44, a cathode 46 and a gate 48. One of the winding terminals 42 is connected to the gate 48, while the tap terminal 38 is connected to the cathode 46. In this arrangement, the logic circuit connects to the power distribution system with the load between the anode 44 and one of the hot lines $L_1$, with the other winding terminal 40 to the other hot line $L_2$, and with either the cathode 46 or the tap terminal 38 to the neutral line N.

In operation the logic circuit of FIG. 3 allows current to pass through the load only if the voltages of the hot lines $L_1$ and $L_2$ are opposite in polarity relative to the neutral line N. This is so because the silicon controlled rectifier 36 only conducts current between the anode 44 and cathode 46 when both the anode 44 and the gate 48 are more positive than the cathode 46. Since the autotransformer 34 inverts the polarity of the voltage on the gate 48 relative to that of hot line $L_2$, the anode 44 and gate 48 are only more positive than the cathode 46 when the logic circuit has been correctly connected to the lines $L_1$, $L_2$ and N, and if no open circuit conditions exist in these lines. Of course, the load could be connected between the cathode 46 and the tap terminal 38, in which case the anode 44 would be connected directly to the hot line $L_1$ and the tap terminal 38 would be connected to the neutral line N.

Figure 4:
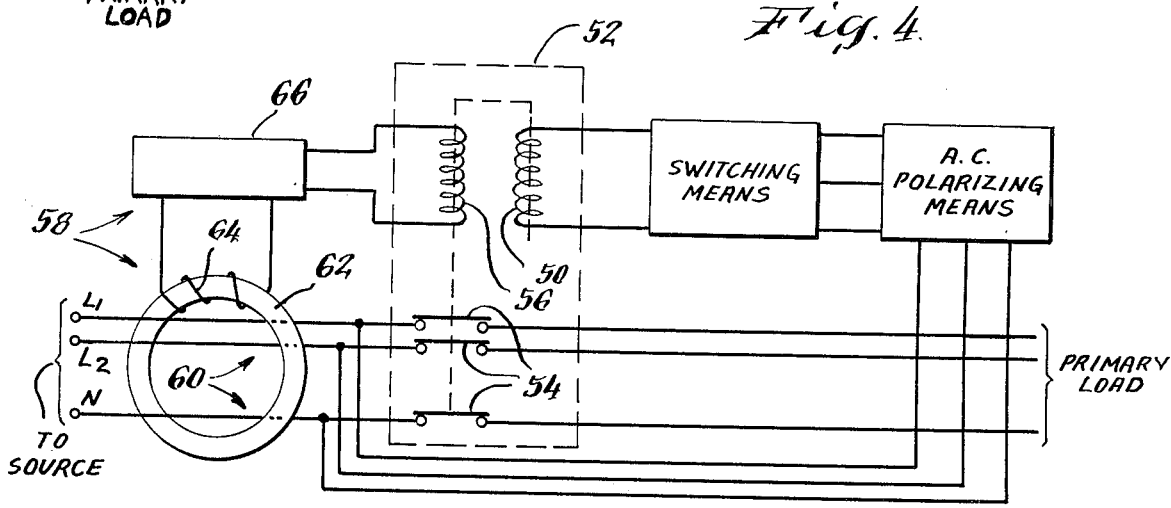
FIG. 4 is a schematic diagram of a detector incorporating the logic circuit of this invention and illustrating the cooperative use thereof with a ground fault circuit interrupter in a circuit breaker.

Although the indicating means utilized with the logic circuit of this invention in creating a detector is not limited to any particular type of load, a coil 50 of a circuit breaker 52 is an appropriate load where undervoltage conditions in the power distribution system are also to be detected. Such an arrangement is illustrated in FIG. 4 where a primary load is connected to the power distribution system through the breaker poles 54 of the circuit breaker 52. The circuit breaker 52 is the well known type in which the breaker poles 54 only remain closed so long as the coil 50 is energized with a minimum voltage. The coil 50 is commonly known in the art as a low voltage release coil and operates to disconnect the primary load from the power distribution system whenever the minimum voltage is not sustained thereacross. Of course, the logic circuit in this arrangement could be that of either FIG. 2 or FIG. 3 and therefore, the minimum voltage will only be applied across the coil 50 when the logic circuit has been correctly connected to the power distribution system and no open circuit conditions exist therein. Furthermore, it should be realized without further explanation that undervoltage conditions occurring thereafter in either hot line $L_1$ or $L_2$ are detected when either the logic circuit of FIG. 2 or FIG. 3 is utilized.

Where a second coil 56 is provided within the circuit breaker 52 to open the breaker poles 54 when energized, the safety features of a ground fault circuit interrupter (GFCI) 58 may be combined with those of the logic circuit. The GFCI 58 employs a differential transformer 60 to detect any current unbalance between the hot lines $L_1$ and $L_2$ and the neutral line N of the power distribution system. The differential transformer 60 includes a toroidal core 62 through which the hot lines $L_1$ and $L_2$ and the neutral line N of the power distribution system are passed as single turn primary windings. Of course, current flows through the hot lines $L_1$ and $L_2$ in the opposite direction to the current in the neutral line N and the sum of the currents in the hot lines $L_1$ and $L_2$ is equal to the current in the neutral line N, so long as no ground faults exist. A secondary winding 64 is disposed on the core 62 and is connected to a sensing circuit 66 through which it drives the second coil 56 of the circuit breaker 52. If a current leakage to ground develops, for example through a person's body, an unbalanced current condition results in the lines of the power distribution system and causes the breaker poles 54 to open when the second coil 56 is energized through the sensing circuit 66 from the secondary winding 64. This action is so rapid that electrical shock having a dangerous nature to the person is prevented.

After a load has been connected to the power distribution system through the logic have of this invention, many applications require that current not be interrupted to the load when open circuit conditions occur in only one hot line $L_1$ or $L_2$. A latching means can be incorporated into the logic circuit for holding the switching means thereof in a conductive state when such conditions occur in the power distribution system. Generally, the latching means is comprised only of a means for dividing a voltage into equal magnitudes and an externally controlled switching means for interrupting current flow. Because the purpose of the latching means can only be accomplished if the load is energized from either hot line $L_1$ or $L_2$, in logic circuits where the load is energized from only one hot line, a rectifying means for deriving a single polarity voltage from between the hot lines $L_1$ or $L_2$ must be included in the latching means. The voltage dividing means is disposed in the logic circuit to connect across the hot lines $L_1$ and $L_2$ of the power distribution system and the output therefrom is directed through the externally controlled switching means to coordinate the latching means with conditions remote to the logic circuit. Of course, the single polarity voltage from the rectifying means of the latching means is directed to energize the load.

Figure 5:
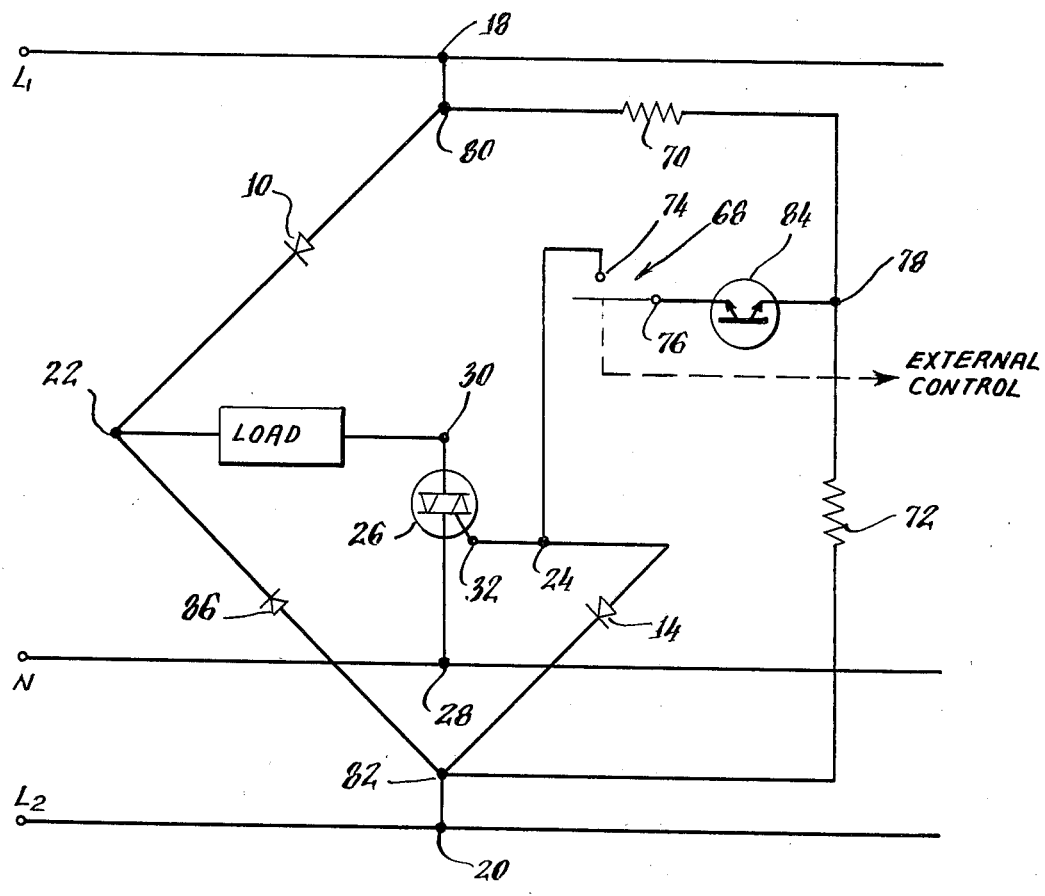
FIG. 5 is a schematic showing the logic circuit of FIG. 2 with a latching means incorporated therein to sustain conductivity across the switching means thereof when open circuit conditions occur in the power distribution system and illustrating the use of an externally controlled switching means to coordinate the effect of the latching means with conditions remote from the logic circuit.

Depending on the particular remote condition to be coordinated therewith, the latching means will havee various arrangements. One such arrangement is illustrated in FIG. 5, where the latching means is incorporated into the logic circuit of FIG. 2. In this arrangement a single pole, single throw switch 68 is utilized as the externally controlled switching means and resistors 70 and 72 of equal values are connected in series as the voltage dividing means. The switch 68 includes wiring terminals 74 and 76 across which electrical continuity is interrupted by a remote condition and the voltage dividing means includes a center tap terminal 78 and input terminals 80 and 82. The wiring terminals 74 and 76 are connected in series between the gate 32 and the center tap terminal 78, while each input terminal 80 and 82 is connected to one of the AC input terminals 18 and 20. Means for sensing threshold voltage levels, such as a diac 84, may also be connected in series between the center tap terminal 78 and the gate 32 when the resistors 70 and 72 are of less than precision quality. Diodes 12 and 16 have not been included in the arrangement of FIG. 5 and therefore, the polarity-responsive means of the logic circuit is a half-wave rectifier. Consequently, diode 86 is connected between the DC output terminal 22 and the hot line $L_2$ to provide a voltage for the load regardless of whether the open circuit occurs in hot line $L_1$ or $L_2$.

With the latching means arranged as shown in FIG. 5, the logic circuit of FIG. 2 operates in the same manner discussed previously except that when the switch 68 is electrically conductive between wiring terminals 74 and 76, the triac 26 continues to conduct current through the load even when an open circuit condition occurs in one of the hot lines $L_1$ or $L_2$. This is so because the absolute level at the center tap terminal 78 rises to a greater value than that of the neutral line N and the triac 26 is held on thereby. When the voltage threshold sensing means is utilized in the circuit the voltage at the center tap terminal 78 must attain the threshold level before any signal is applied to the gate 32, and therefore, the need for an exacting voltage division at the center tap terminal 78 is avoided. It should be realized without further explanation that the single pole, single throw switch 68 of this arrangement could be included as a fourth breaker pole 54 in the circuit breaker 52 of FIG. 4. By so doing the latching means is rendered of no effect until after correct connections of the logic circuit to the power distribution system and the absence of open circuit conditions therein have been verified.

Figure 6:
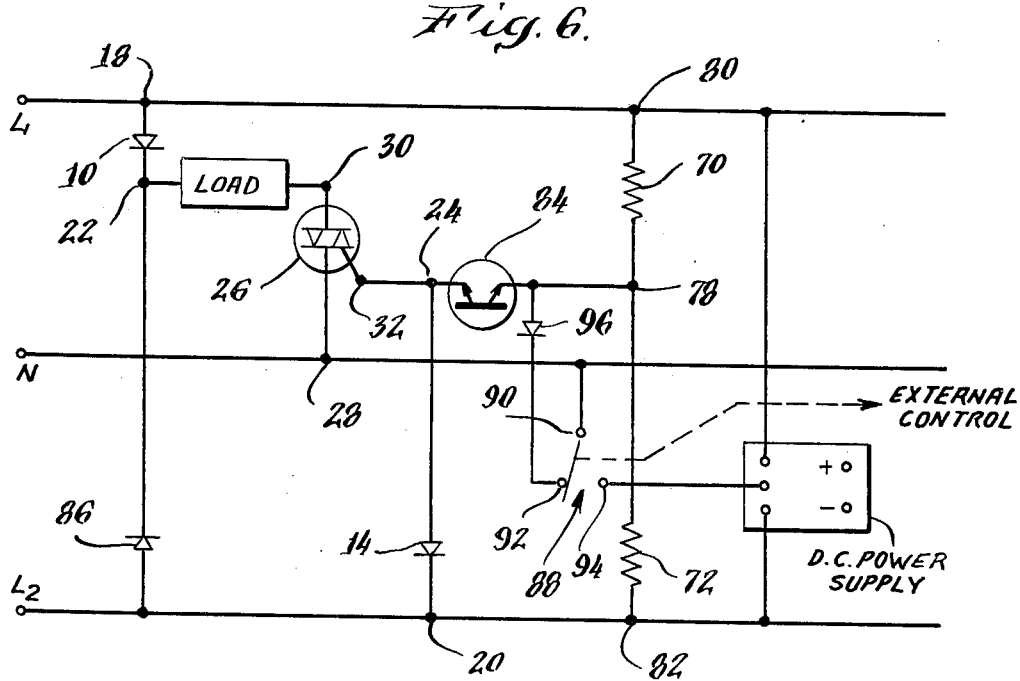
FIG. 6 is a schematic showing the logic circuit of FIG. 2 with another latching means incorporated thereinto and illustrating the use of the externally controlled switching means to coordinate the effect of the latching means with the energizing of a DC power supply.

Another arrangement of the latching means in the logic circuit of FIG. 2 is illustrated in FIG. 6 where the circuitry is the same as that of FIG. 5 except that the externally controlled switching means is disposed to shunt the center tap terminal 78 to the neutral line N. Also, a single pole, double throw switch 88 is utilized as the externally controlled switching means and includes wiring terminals 90, 92 and 94. Within the switch 88, electrical continuity exists across either wiring terminals 90 and 92 or wiring terminals 90 and 94 subject to the control of a remote condition. Wiring terminal 90 is connected to the first main terminal 28, wiring terminal 92 is connected to the center tap terminal 78, and wiring terminal 94 is connected to the neutral AC input of a DC power supply. Means for conducting unidirectional voltages, such as a diode 96, may also be connected in series with the switch 88 between the center tap terminal 78 and the first main terminal 28 to conserve on the power dissipated. Of course, the gate 32 is either directly connected to the center tap terminal 78 or the voltage threshold sensing means is connected therebetween, as shown in FIG. 6.

With the latching means arranged as shown in FIG. 6, the logic circuit of FIG. 2 operates in the same manner discussed previously except that when the switch 88 is open between wiring terminals 90 and 92, the triac 26 continues to conduct current through the load even when an open circuit condition occurs in one of the hot line $L_1$ or $L_2$. This is so because the absolute voltage level at the center tap terminal 78 is above that of the neutral line N during any such open circuit conditions and therefore, the triac 26 is held on thereby. Of course, when the switch 88 is closed between wiring terminals 90 and 92, the triac 26 receives no signal from the center tap terminal 78 which is then short circuited to the neutral line N. The diode 96 only permits current to pass from the center tap terminal 78 to the neutral line N during half of each AC cycle and therefore, limits the power dissipation encountered across resistors 70 and 72 when the switch 88 is closed between wiring terminals 90 and 92. It should be realized without further explanation that the DC power supply is only energized from the power distribution system when the switch is closed between wiring terminals 90 and 94 and open between wiring terminals 90 and 92. Therefore, the DC power supply is only energized after the latching means has become effective within the logic circuit. Of course, the DC power supply in no way limits the scope of this invention and is only utilized for illustrative purposes.

Figure 7:
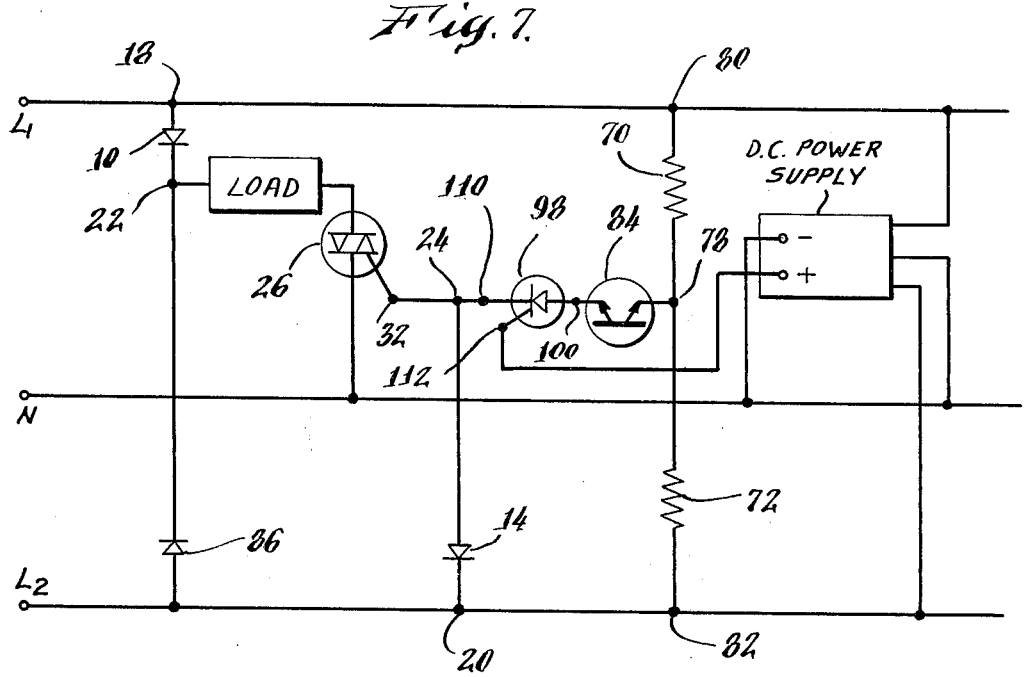
FIG. 7 is a schematic showing the logic circuit of FIG. 2 with another latching means incorporated thereinto and illustrating the use of a semiconductor switch as the externally controlled switching means to coordinate the effect of the latching means with the existence of positive DC supply voltage.

Still another arrangement of the latching means in the logic circuit of FIG. 2 is illustrated in FIG. 7 where the circuitry is the same as that of FIG. 5 except that a silicon controlled rectifier 98 is utilized as the externally controlled switching means. The silicon controlled rectifier 98 includes an anode 100, a cathode 110 and a gate 112, and electrical conductivity therethrough is controlled remotely from a DC power supply. The gate 112 is connected to the positive terminal of the DC power supply while the anode 100 and cathode 110 are connected in series between the center tap terminal 78 and the gate 32 of the triac 26.

With the latching means arranged as shown in FIG. 7, the logic circuit of FIG. 2 operates in the same manner discussed previously except that the triac 26 continues to conduct current through the load when an open circuit condition occurs in one of the hot lines $L_1$ or $L_2$ only if the DC power supply has been energized from the power distribution system and is operative to produce a positive DC voltage. This is so because the silicon controlled rectifier 98 is only electrically conductive between the anode 100 and the cathode 110 when a positive signal is imposed on the gate 112 by the DC power supply.

Figure 8:
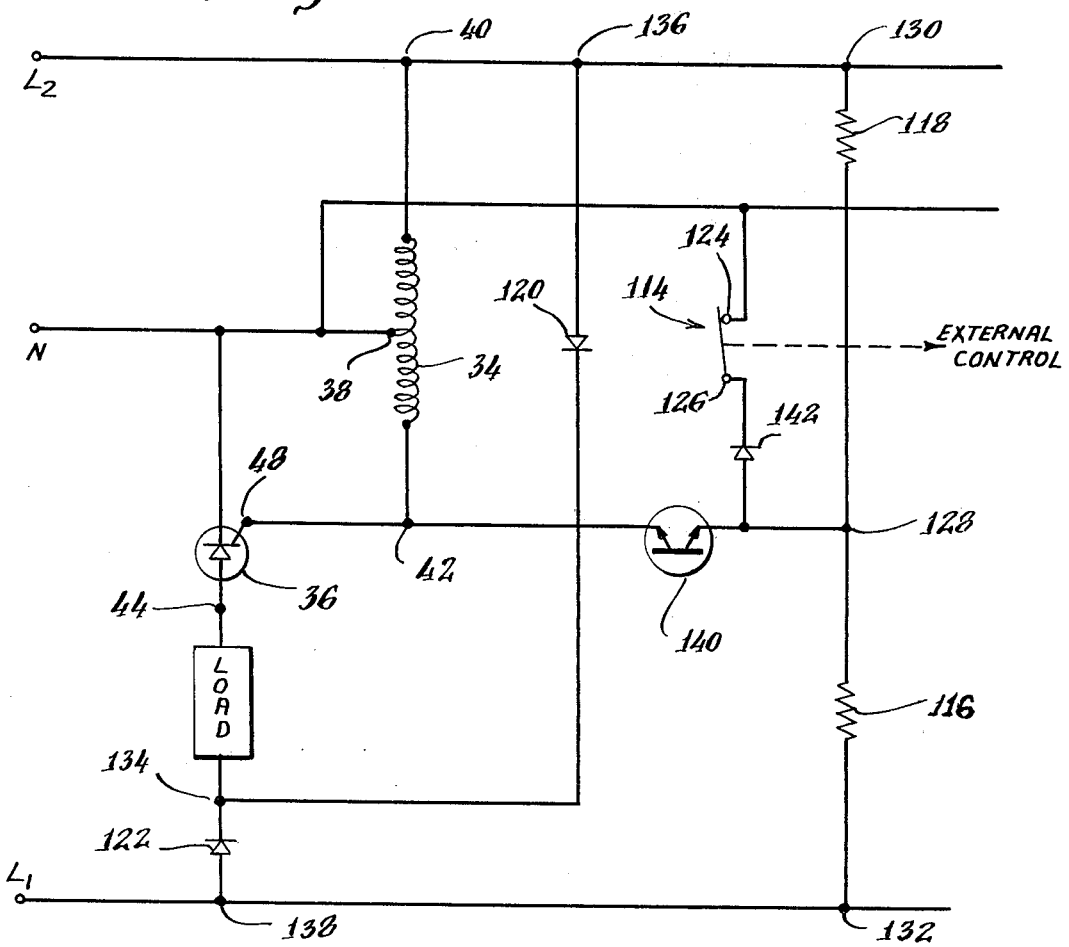
FIG. 8 is a schematic showing the logic circuit of FIG. 3 with a latching means incorporated therein to sustain conductivity across the switching means thereof when open circuit conditions occur in the power distribution system and illustrating the use of an externally controlled switching means to coordinate the effect of the latching means with conditions remote from the logic circuit.

The latching means can also be incorporated into the logic circuit of FIG. 3 in any of the arrangements and with any of the synchronized effects discussed previously. To avoid redundancy, only one such arrangement is illustrated in FIG. 8 where a single pole, single throw switch 114 is utilized as the externally controlled switching means. Resistors 116 and 118 of equal values are connected in series as the voltage dividing means and diodes 120 and 122 are connected in series as the rectifying means which is included to energize the load with a single polarity voltage from either hot line $L_1$ or $L_2$. The switch 114 includes wiring terminals 124 and 126 across which electrical continuity is interrupted by a remote condition, while the voltage dividing means includes a center tap terminal 128 and input terminals 130 and 132, and the rectifying means includes a positive tap terminal 134 and AC terminals 136 and 138. The wiring terminals 124 and 126 are connected in series between the center tap terminal 128 and the tap terminal 38, while one input terminal 130 and one AC terminal 136 are connected to winding terminal 40. The other input terminal 132 is connected to the other AC terminal 138 and the center tap terminal 128 is connected to the gate 48 with a means for sensing threshold voltage levels, such as a diac 140, connected therebetween, if the resistors 116 and 118 are of less than precision quality. The logic circuit resulting from this arrangement connects to the power distribution system with the AC terminals 136 and 138 across the hot line $L_1$ and $L_2$ and the tap terminal 38 to the neutral line N, with the load connected between the anode 44 and the positive tap terminal 134. Furthermore, a means for conducting unidirectional voltages, such as a diode 142, may also be connected in series with the switch 114 between the center tap terminal 128 and the tap terminal 38 to conserve on the power dissipated.

With the latching means arranged as shown in FIG. 8, the logic circuit of FIG. 3 operates in the same manner discussed previously except that when the switch 114 is open between wiring terminals 124 and 126, the silicon controlled rectifier 36 continues to conduct current through the load even when an open circuit condition occurs in one of the hot lines $L_1$ or $L_2$. This is so because during each AC cycle a positive voltage develops at the center tap terminal 128 simultaneously with a positive voltage at the positive tap terminal 134 whenever an open circuit condition occurs in either hot line $L_1$ or $L_2$ and therefore, electrical conductivity is maintained across the silicon controlled rectifier 36. However, when the switch 114 is closed between wiring terminals 124 and 126, the center tap terminal 128 is short circuited to the neutral line N and the gate 48 receives no positive signal so that the silicon controlled rectifier 36 is nonconductive during the open circuit condition. It should be realized without further explanation that the effect of the latching means in the logic circuit is coordinated with an external condition through the switch 114. When the voltage threshold sensing means is utilized in the circuit the voltage at the center tap terminal 128 must attain the threshold level before any signal is applied to the gate 48 and therefore, the need for an exacting voltage division at the center tap terminal 128 is avoided. Furthermore, when the unidirectional voltage means is utilized current only passes from the center tap terminal 128 to the neutral line N during half of each AC cycle and therefore, the power dissipation encountered across resistors 116 and 118 is limited when the switch 114 is closed between wiring terminals 124 and 126.

Those skilled in the art should readily appreciate that the logic circuit of this invention can be utilized to verify the making of correct connections to a power distribution system and the absence of open circuit conditions therein. The logic circuit can be combined with an indicating means to create a detector and when the indicating means is a low voltage release coil of a circuit breaker, undervoltage conditions in the power distribution system may also be detected therewith. Through the circuit breaker the features of the logic circuit can also be combined with those of a ground fault circuit interrupter. Furthermore, a latching means may be included in the logic circuit to override the effect thereon of open circuit conditions occurring in either hot line of the power distribution system after the absence of such conditions has been initially verified. Of course, the effect of the latching means in the logic circuit can be synchronized with remote conditions to the logic circuit.

It should be understood that the present disclosure has been made only by way of example and that numerous changes in details of construction and the combination or arrangement of parts may be resorted to without departing from the true spirit and scope of the invention. Therefore, the present disclosure should be construed as illustrative only rather than limiting.

What we claim is:

1. The combination of a logic circuit for use with a three-wire AC power distribution system to verify proper connections thereto or open circuit conditions therein and a ground fault sensing circuit, the power distribution system having two nongrounded lines and a neutral line, said logic circuit comprising:

semiconductor switching means having conductive and nonconductive states for selectively interrupting current flow therethrough;

polarity-responsive means for synchronizing the states of said switching means with conditions of opposite voltage polarities in the nongrounded lines relative to the neutral line, said polarity-responsive means rendering said switching means nonconductive when conditions of opposite voltage polarities fail to exist in the nongrounding lines of the power distribution system;

said switching means having first and second main terminals and a control terminal, said polarity-responsive means having plural AC input terminals and plural DC output terminals, said control terminal coupled to one of said DC output terminals;

a load series coupled to said main terminals between the other DC output terminal and the neutral line and receiving current by way of said logic circuit when the nongrounded lines are connected to said AC input terminals if no open circuit conditions exist in the power distribution system;

means for indicating electrical conductivity coupled as said load to detect when proper connections are made to the power distribution system or open circuit conditions exist therein, said indicating means comprising first and second coils mounted in a circuit breaker, said breaker having breaker poles electromechanically linked with said first coil to open when the energizing voltage of said first coil is below a predetermined minimum level and said breaker poles being electromechanically linked with said second coil to open when energizing voltage is applied to said second coil;

latching means for holding said switching means in a conductive state when open circuit conditions exist in one nongrounded line of the power distribution system;

said latching means including an externally controlled switching means for interrupting current flow and means for dividing a voltage into equal magnitudes, said externally controlled switching means having wiring terminals across which electrical conductivity is interrupted, said voltage dividing means having input terminals and a center tap terminal at the divided voltage level, said input terminals being connected to said AC input terminals, said wiring terminals being connected between said control terminal and said center tap terminal, said center tap terminal attaining a voltage level relative to the neutral line when open circuit conditions exist in either nongrounded line of the power distribution system, said voltage level holding said switching means in a conductive state when said externally controlled switching means is closed to conduct current therethrough; and a ground fault sensing circuit connected to energize said second coil when current leakage to ground of predetermined magnitude occurs in the power distribution system.

2. The logic circuit of claim 1 wherein said externally controlled switching means is an electronic switch.

3. The logic circuit of claim 2 wherein said electronic switch is a silicon-controlled rectifier having an anode, a cathode, and a gate; said anode and said cathode being said wiring terminals; said gate controlling the electrical conductivity across said wiring terminals with voltage from a source remote to said logic circuit.

4. The logic circuit of claim 1 wherein said switching means is a silicon-controlled rectifier and said polarity-responsive means is an autotransformer; said silicon-controlled rectifier having an anode, a cathode, and a gate, the anode and cathode being coupled to different ones of said main terminals and said gate being coupled to said control terminal; said autotransformer having a tap terminal and a pair of winding terminals; said gate being connected by way of said control terminal to either said winding terminal; said logic circuit conducting current through a load connected in series with said anode and said cathode between either non-grounded line and said tap terminal when the other nongrounded line is connected to the other said winding terminal and the neutral line is connected to said tap terminal if no open circuit conditions exist in the power distribution system.

5. The logic circuit of claim 4 wherein means for indicating electrical conductivity is connected as the load to detect when proper connections are made to the power distribution system or open circuit conditions exist. therein.

6. The detector of claim 5 wherein said indicating means is a low voltage release coil within a circuit breaker, said circuit breaker including breaker poles, said breaker poles being electromechanically linked with said coil to open when the energizing voltage of said coil is below a minimum level.

7. The logic circuit of claim 4 wherein a latching means is included therein for holding said silicon controlled rectifier in a conductive state when open circuit conditions exist in one nongrounded line of the power distribution system.

8. The logic circuit of claim 7 wherein said latching means includes an externally controlled switching means for interrupting current flow, means for dividing a voltage into equal magnitudes, and a rectifying means for deriving a single polarity voltage from between the nongrounded lines; said externally controlled switching means having wiring terminals across which electrical conductivity is interrupted, said voltage dividing means having input terminals and a center tap terminal at the divided voltage level, said rectifying means having AC terminals and a positive tap terminal; each said AC terminal being connected to one of said input terminals, said wiring terminals being connected between said center tap terminal and said gate, either said AC terminal being connected to said other winding terminal; said logic circuit conducting current through a load connected in series with said anode and said cathode between said positive tap terminal and the neutral line when the nongrounded lines are connected to said AC terminals if no open circuit conditions exist in the power distribution system; said center tap terminal attaining a voltage level relative to the neutral line when open circuit conditions exist in either nongrounded line of the power distribution system, said voltage level holding said silicon-controlled rectifier in a conductive state when said externally controlled switching means is closed to conduct current therethrough.

9. The logic circuit of claim 7 wherein said latching means includes an externally controlled switching means for interrupting current flow, means for dividing a voltage into equal magnitudes, and a rectifying means for deriving a single polarity voltage from between the nongrounded lines; said externally controlled switching means having wiring terminals across which electrical conductivity is interrupted, said voltage dividing means having input terminals and a center tap terminal at the divided voltage level, said rectifying means having AC terminals and a positive tap terminal; each said AC terminal being connected to one of said input terminals, said wiring terminals being connected between said tap terminal and said center tap terminal, either said AC terminal being connected to said other winding terminal and said center tap terminal being connected to said gate; said logic circuit conducting current through a load connected in series with said anode and said cathode between said positive tap terminal and the neutral line when the nongrounded lines are connected to said AC terminals if no open circuit conditions exist in the power distribution system; said center tap terminal attaining a voltage level relative to the neutral line when open circuit conditions exist in either nongrounded line of the power distribution system, said voltage level holding said silicon-controlled rectifier in a conductive state when said externally controlled switching means is open to interrupt current flow therethrough.

10. The logic circuit of claim 9 wherein said externally controlled switching means is an electronic switch.

11. The logic circuit of claim 10 wherein said electronic switch is a second silicon-controlled rectifier having a second anode, a second cathode and a second gate; said second anode and said second cathode being said wiring terminals, said second gate controlling the electrical conductivity across said wiring terminals with voltage from a source remote from said logic circuit.

12. The logic circuit of claim 9 wherein means for conducting unidirectional voltages is connected in series with said wiring terminals between said center tap terminal and said tap terminal, said unidirectional conductive means being effective to minimize power dissipated in said voltage dividing means when said externally controlled switching means is closed to conduct current therethrough.

13. The logic circuit of claim 9 wherein means for sensing threshold voltage levels is connected between said center tap terminal and said gate, said voltage threshold means being effective to compensate for imprecise voltage divisions at said center tap terminal.

* * * * *

UNITED STATES PATENT OFFICE
CERTIFICATE OF CORRECTION

Patent No. 3,944,891    Dated  March 16, 1976

Inventor(s) Thomas Michael McDonald and Paul Muchnick

It is certified that error appears in the above-identified patent and that said Letters Patent are hereby corrected as shown below:

After "[76] Inventors:" etc., please insert
--[73] Assignee:  Harvey Hubbell, Incorporated,
                  Orange, Conn.--.
See Assignment filed with this application.

After "Assistant Examiner-Patrick R. Salce" please insert
--Attorney, Agent, or Firm-Wooster, Davis & Cifelli--.
See Oath, Power of Attorney, and Petition filed with this application.

Abstract, line 9, delete "nongrounded or".
See specification, Abstract, line 9, as filed.

Column 1, line 17, delete "hot" and substitute therefor
--nongrounded or "hot"--.
See Amendment dated June 13, 1975, page 1, lines 4 - 5, as filed.

Column 4, line 67, delete "have" and substitute therefor
--circuit--.
See specification, page 9, line 26, as filed.

Column 9, line 58 (Claim 4, line 12), "non-grounded" should be --nongrounded--.
See Amendment dated June 13, 1975, page 4, line 1, as filed.

Column 9, line 68 (Claim 5, line 5), delete the first occurrence of the period (.).
See specification, Claim 21, line 4, as filed.

Signed and Sealed this

Sixth Day of July 1976

[SEAL]

Attest:

RUTH C. MASON
Attesting Officer

C. MARSHALL DANN
Commissioner of Patents and Trademarks